US011663222B2

(12) United States Patent
Pichaimurthy et al.

(10) Patent No.: US 11,663,222 B2
(45) Date of Patent: *May 30, 2023

(54) VOICE QUERY REFINEMENT TO EMBED CONTEXT IN A VOICE QUERY

(71) Applicant: Rovi Guides, Inc., San Jose, CA (US)

(72) Inventors: Rajendran Pichaimurthy, Bangalore (IN); Madhusudhan Seetharam, Bangalore (IN); Harshith Kumar Gejjegondanahally Sreekanth, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,852

(22) Filed: Jul. 18, 2022

(65) Prior Publication Data
US 2023/0004567 A1    Jan. 5, 2023

Related U.S. Application Data

(63) Continuation of application No. 16/206,385, filed on Nov. 30, 2018, now Pat. No. 11,468,071.

(51) Int. Cl.
| | |
|---|---|
| *G06F 16/2457* | (2019.01) |
| *G06F 16/2452* | (2019.01) |
| *G10L 15/26* | (2006.01) |
| *G06F 40/253* | (2020.01) |
| *G06F 40/289* | (2020.01) |
| *G06F 40/30* | (2020.01) |
| *G10L 15/22* | (2006.01) |
| *G06V 40/20* | (2022.01) |

(52) U.S. Cl.
CPC ........... *G06F 16/24575* (2019.01); *G06F 16/24522* (2019.01); *G06F 40/253* (2020.01); *G06F 40/289* (2020.01); *G06F 40/30* (2020.01); *G06V 40/20* (2022.01); *G10L 15/22* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 9,830,391 | B1 | 11/2017 | Bakir et al. |
| 10,437,833 | B1 | 10/2019 | Nguyen |
| 2013/0086105 | A1 | 4/2013 | Hammontree et al. |
| 2014/0188925 | A1 | 7/2014 | Skolicki |

(Continued)

FOREIGN PATENT DOCUMENTS

| | | |
|---|---|---|
| EP | 3557441 A1 | 10/2019 |
| WO | 2017044260 A1 | 3/2017 |
| WO | 2018043990 A1 | 3/2018 |

OTHER PUBLICATIONS

International Search Report and Written Opinion of PCT/US2019/063181 dated Feb. 21, 2020.

*Primary Examiner* — Eddy Cheung
(74) *Attorney, Agent, or Firm* — Haley Guiliano LLP

(57) ABSTRACT

Systems and methods are described for providing contextual search results. The system may receive a search query during presentation of a video. If the query is ambiguous, the system accesses some of the frames of the video. The frames are analyzed to identify a performed action depicted in the frames. The system retrieves a keyword related to the identified action. The ambiguous query is augmented with the keyword. The augmented search query is used to search for and output relevant search results.

20 Claims, 9 Drawing Sheets

(56) References Cited

U.S. PATENT DOCUMENTS

| | | |
|---|---|---|
| 2016/0195856 A1 | 7/2016 | Spero |
| 2017/0242857 A1 | 8/2017 | Kim |
| 2018/0107748 A1 | 4/2018 | Skolicki |
| 2019/0244270 A1 | 8/2019 | Kim et al. |
| 2019/0258851 A1 | 8/2019 | Rajan et al. |
| 2019/0294668 A1 | 9/2019 | Goel et al. |

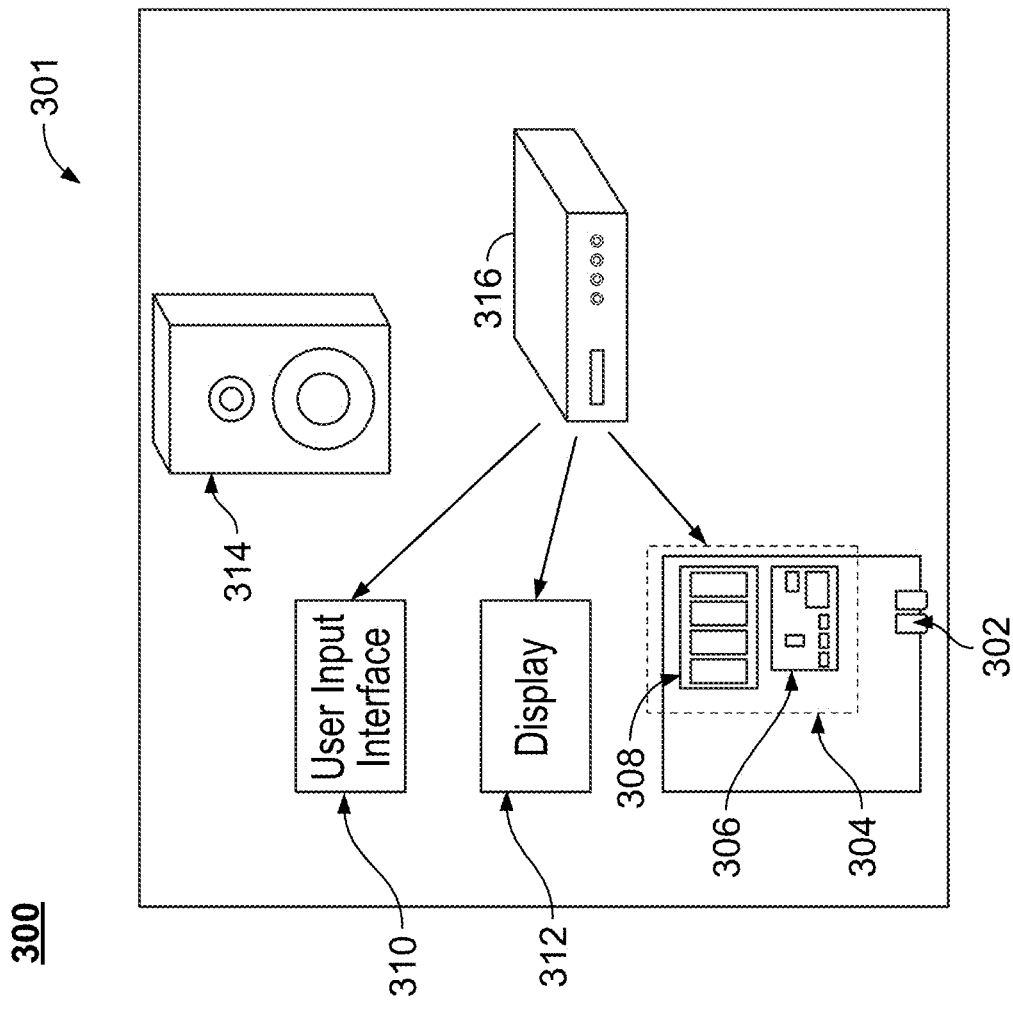
FIG. 3
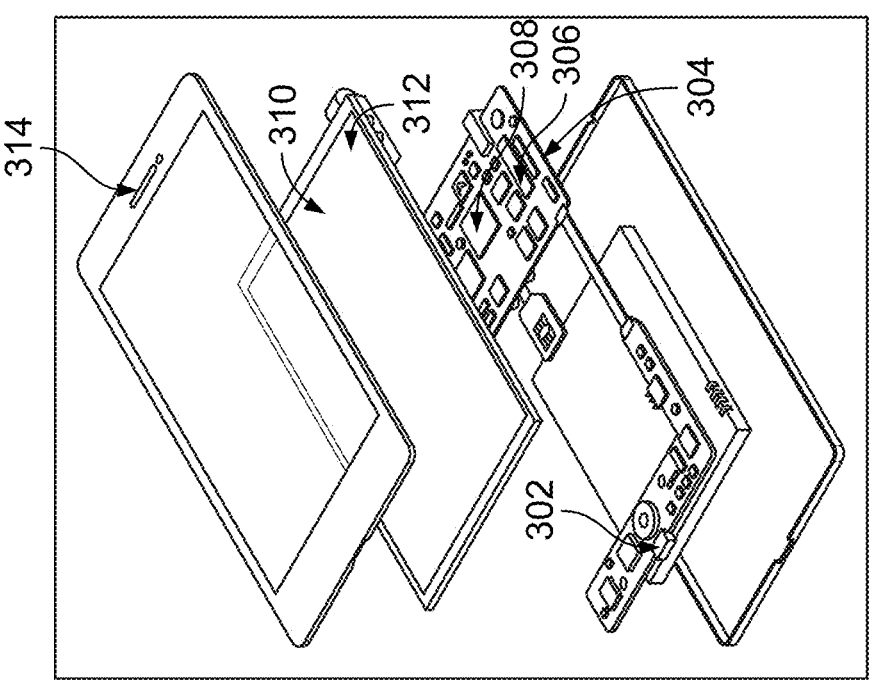

VOICE QUERY REFINEMENT TO EMBED CONTEXT IN A VOICE QUERY

CROSS-REFERENCE TO RELATED APPLICATIONS

This application is a continuation of U.S. patent application Ser. No. 16/206,385, filed Nov. 30, 2018, the disclosure of which is hereby incorporated by reference herein in its entirety.

BACKGROUND

The present disclosure relates to improved computerized search, and more particularly, to methods and systems for providing contextual search results to an ambiguous query by identifying an action being performed in a concurrently presented video, and modifying the query based on the identified action.

SUMMARY

Modern computerized search systems often receive user queries that are ambiguous. The search systems are often unable to return appropriate results in response to a receipt of such a query. For example, queries like "what is this?", "what is she doing" or "where is he going" are very difficult for search systems to interpret because they are too general or missing key information. In particular, pronouns like "he" or "she" or auxiliary verbs like "do" would return too many results unrelated to a topic that is actually relevant to the request. In one approach, a search system may attempt to supplement the ambiguous search query with contextual information. For example, such a search system may extract information about the media asset that is being presented to the user when the search query was received. In one example, if a certain movie was being shown on TV, the search system may supplement the search query with information about objects that are being shown. However, such an approach does not improve search results for a query related to an action that is being performed in video. For example, if the search query is an ambiguous query "what is she doing," a system mentioned above would be unable to improve such a query simply by adding information about objects because information about statistic objects does help resolve the ambiguity related to an action.

Accordingly, to overcome such problems, methods and systems are disclosed herein for providing contextual search results to an ambiguous query by augmenting that query to include metadata (e.g., a keyword) related to an action that occurred in a video that was presented concurrently with receiving the search query (e.g., "What is she doing"). In one embodiment, a search application analyzes the query to determine that it is ambiguous. For example, the search application determines that that the query includes an auxiliary verb or a term with multiple possible meanings. In response, the search application accesses a plurality of frames from the video that were presented concurrently with receiving the search query (e.g., by extracting frames of a video that was played on a computer screen in a vicinity of the user). By analyzing frames of a concurrently presented video, the search application can acquire context for the user's ambiguous query and provide significantly improved search results that are more relevant to the query.

For example, the search application captures a predetermined number of frames that were shown on a screen in a vicinity of the user when the search query was received. The accessed frames are analyzed to identify an action that was depicted by these frames. Once the action is identified, the search application augments the search query with a keyword related to the action. For example, if the search application detected that a video depicted a character who was rappelling from a mountain, the search application may augment the query to include a keyword "rappelling." The system may then perform a search using the augmented query and output the results. Because the ambiguous query was supplemented with a keyword associated with an action that that occurred in a concurrently presented video, the search application can acquire search results that are significantly more relevant to the query than results that would be generated in response to an ambiguous query.

In one illustrative embodiment, the search application may identify the performed action by identifying a character (e.g., a human body) in each of the plurality of frames. The search application generates a model for the movement of the identified character. For example, the search application may identify body parts of the character in the frame and calculate angles between body parts of that character. In some embodiments, the search application calculates angles between the body trunk and the arms, between the body trunk and the legs, as well as bend angles at the elbows and knees. The system may also identify changes between such angles between frames of the plurality of frames. The calculated angles (or changes in angles) may then be compared to the angle values (or angle change values) stored in a template for specific types of an action. If the calculated angle sufficiently matches the stored angle values of a template, the search application may determine that the action that was shown in the plurality of frames corresponds to the action of that template. For example, the search application may retrieve a keyword of the template and use it to augment the query.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a block diagram of an illustrative user equipment device in accordance with some embodiments of the disclosure;

DETAILED DESCRIPTION

Figure 1:
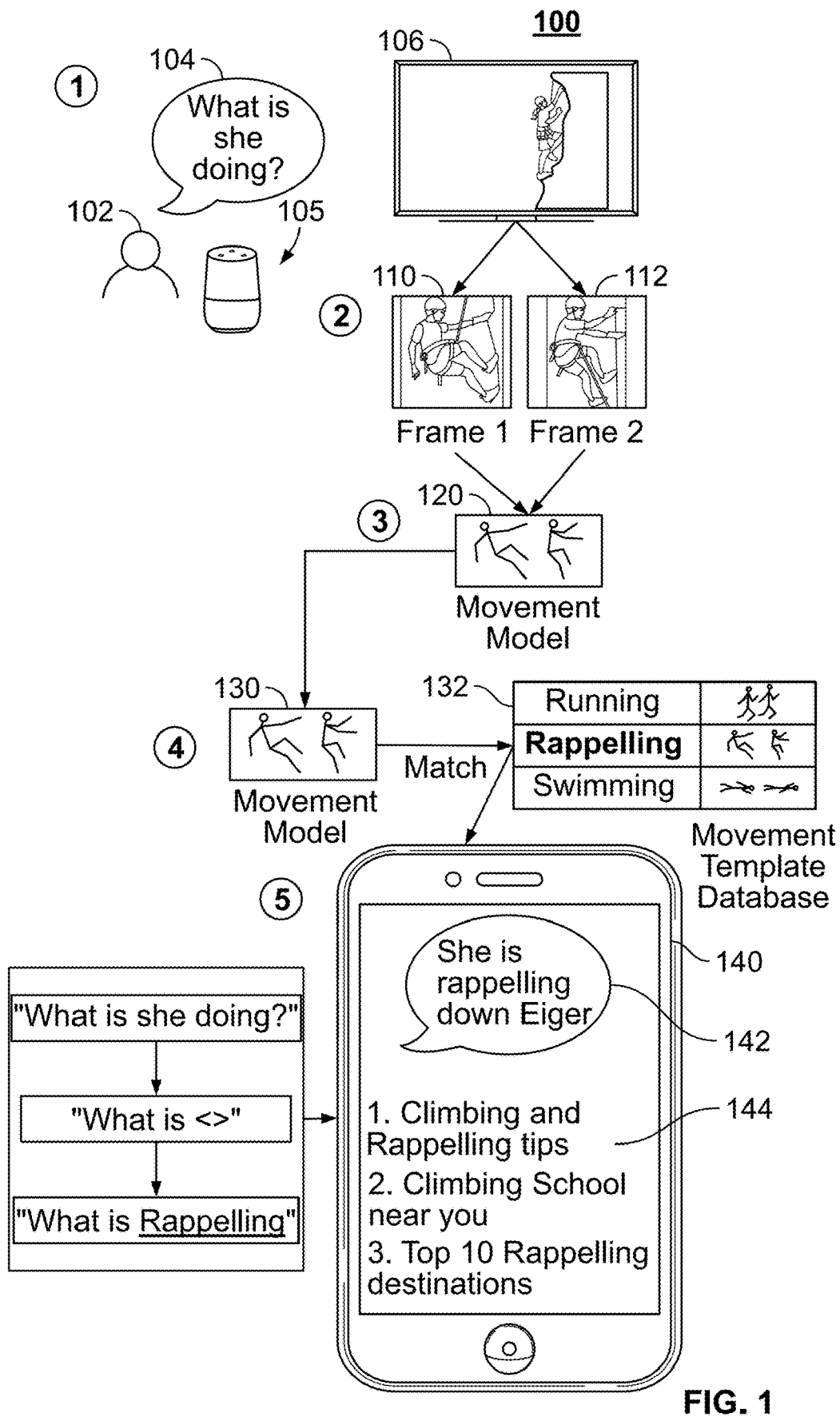
FIG. 1 shows an illustrative example for providing contextual search results to an ambiguous query, in accordance with some embodiments of the disclosure.

FIG. 1 shows an illustrative example of a search application for providing contextual search results, in accordance with some embodiments of the disclosure. In particular, FIG. 1 shows a scenario 100 where a query 104 (e.g., query "What is she doing") is received via user input/output device 105 (e.g., a digital voice assistant). In some embodiments, the query is received as voice input from user 102. The search application may determine that the query 104 is ambiguous. For example, the search application may determine that query 104 comprises an auxiliary verb, and ambiguous term, or a pronoun. The search application may determine that query 104 is ambiguous because it includes auxiliary verb "doing" and no other verbs.

In response to the determination, the search application may leverage a presentation of a video on screen 106 in a vicinity of user 102 to augment the search query. In some embodiments, the search application extracts several frames of a video (e.g., a movie or a TV show) that is being presented on display 106 concurrently with a receipt of the query. For example, the search application may capture 10 frames of the video after the receipt of the query or retrieve all frames presented for 2 seconds before and after the receipt of the query.

In some embodiments, the search application analyzes the frames of the video to identify a performed action depicted in those frames. For example, the search application may analyze a first frame 110 and a second frame 112. The search application mat identify a human character present in frames 110 and 112. For example, a human character may be identified by a computer vision algorithm trained to look for typical human shapes. The search application may then generate movement model 130 of the character. For example, the search application may generate vector repreparation of the character's body in each analyzed frame to create movement model 130.

In some embodiments, the search application compares movement model 130 with templates from movement template database 132. For example, the search application may access movement template database 132 that includes three templates (or any other number of templates). Each template may be associated with an activity and comprise a keyword identifying the activity (e.g., "running," "swimming, "rappelling"). Each template may also comprise a model (e.g. a vector model) of character movement normally associated with the respective activity, and each model may compromise vector graphics (as shown in FIG. 1), or a list of angles defined by the vectors.

In some embodiments, the search application compares movement model 130 with each template of template database 132. For example, the search application may compare the vectors, or stored angles between the vector components. The search application may determine that movement model 130 matches a template when vector graphics of the template movement model 130 are sufficiently similar (e.g., if the least square analysis of vector similarity returns a value that is below a threshold.). In the example shown in FIG. 1, the search application determines that the movement model 130 is sufficiently similar to the "rappelling" template of movement template database 132.

In some embodiments, after the search application determines that movement model 130 matches a template of movement template database 132, the search application may extract a keyword of the matching template. In the example shown in FIG. 1, the search application extracts the keyword "rappelling." The search application may augment query 104 with the extracted keyword. For example, the search application may remove pronouns and auxiliary verbs from query 104 ("What is she doing") and replace them with the exacted keyword resulting in an augmented query "What is rappelling?" The search application may perform a search (e.g., Internet search, local database search, etc.,) and output the results of the search. In some embodiments, results 144 may be displayed on a display of user device 140. The search application may also use the keyword to generate an answer 142 to query 104 which may also be displayed on a display of user device 140. The search application may output the results via audio using input/output device 105 (e.g., a digital voice assistant).

Figure 2:
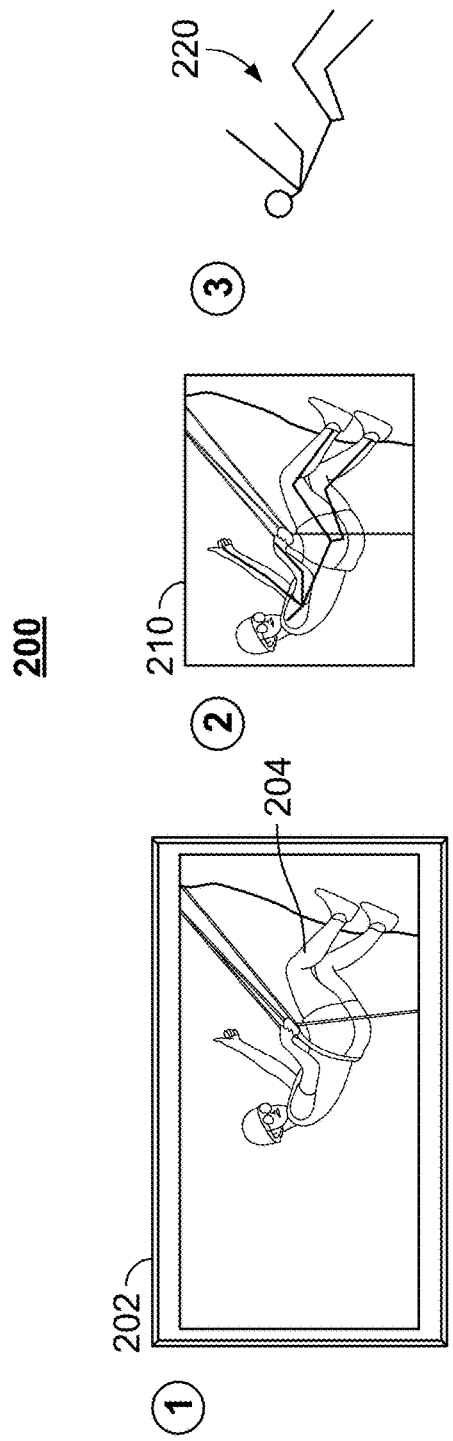
FIG. 2 shows an illustrative example for identifying a performed action based on frames of a video, in accordance with some embodiments of the disclosure.
Figure 2:
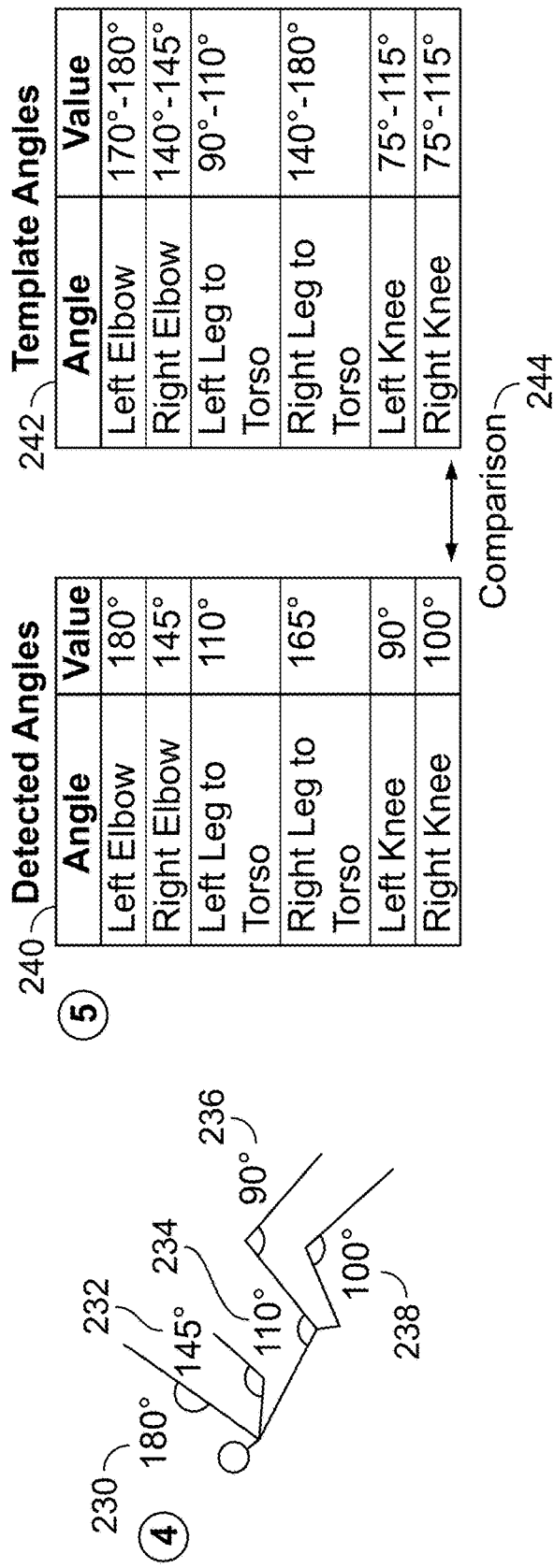

FIG. 2 shows an illustrative example of a search application for identifying a performed action based on frames of a video. In particular, FIG. 2 shows a scenario 200 where a scene extracted from a video is analyzed to identify a performed action. In some embodiments, scenario 200 is performed as part of Scenario of FIG. 1 where frames 110 and 120 were analyzed. For example, the search application may extract frame 202 (e.g., one of frame 110 or frame 120). The search application may identify character 202 in that frame (e.g., character 202 may be a human rappelling down a mountain). The search application mat vectorize the identified character 202 by drawing vectors along body parts (e.g., trunk, legs and fees) of the character. The resulting vector model 220 is further analyzed by the search application. For example, vector model 220 may include vectors representing body torso, left arm, left forearm, right arm, right forearm, left thigh, right thigh, left ankle, and right ankle.

In some embodiments, the search application determines angles between multiple vectors that represent multiple body parts. For example, the search application may determine left elbow angle 230, right elbow angle 223, left leg torso angle 234, left knee angle 236, and right knee angle 238. In some embodiments, other angles may also be measured. The search application may store the angles 240 as part of a movement template. The search application may also store angles detected using the process above for other extracted frames. The search application may calculate angle changes across the planarity of analyzed frames.

In some embodiments, the search application may compare 244 the detected angles 240 or angle changes to template angles 242 (e.g., angles stored as part of a movement template). If the angles (or angle changes) are sufficiently similar, the search application may identify the performed action based on the metadata of the matching template. For example, if template angles 242 are part of the template with a keyword "rappelling," the search application may identify action performed in frame 202 (and surrounding frames) as "rappelling."

FIG. 3 shows generalized embodiments of a system that can host a search application. For example, the system may include user equipment device 300. User equipment device 300 may be one of a user smartphone device, user computer equipment, or user television equipment. User television equipment system may include a set-top box 316. Set-top box 316 may be communicatively connected to speaker 314 and display 312. In some embodiments, display 312 may be a television display or a computer display. Set top box 316 may be communicatively connected to user interface input 310. In some embodiments, user interface input 310 may be a remote-control device. User interface input 310 may be a voice controlled digital assistant device (e.g., Amazon Echo™). Set-top box 316 may include one or more circuit boards. In some embodiments, the circuit boards may include processing circuitry, control circuitry, and storage (e.g., RAM, ROM, Hard Disk, Removable Disk, etc.). Such circuit boards may include an input/output path. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. For example, the search application may provide instructions to control circuitry 304 to generate the media guidance displays. In some implementations, any action performed by control circuitry 304 may be based on instructions received from the search application.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The search application may be implemented using any suitable architecture. For example, it may be a stand-alone application wholly-implemented on user equipment device 300. In such an approach, instructions of the search application are stored locally (e.g., in storage 308), and data for use by the application is downloaded on a periodic basis (e.g., from an out-of-band feed, from an Internet resource, or using another suitable approach). Control circuitry 304 may retrieve instructions of the search application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the search application is a client-server based application. Data for use by a thick or thin client implemented on user equipment device 300 is retrieved on-demand by issuing requests to user equipment device 300. In one example of a client-server based guidance application, control circuitry 304 runs a web browser that interprets web pages provided by a remote server. For example, the remote server may store the instructions for the search application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating a search query received from a user.

The remote server may process instructions in accordance with that input and generate an output corresponding to the input (e.g., search results). The generated display is then transmitted to equipment device 300 for presentation to the user.

Figure 4:
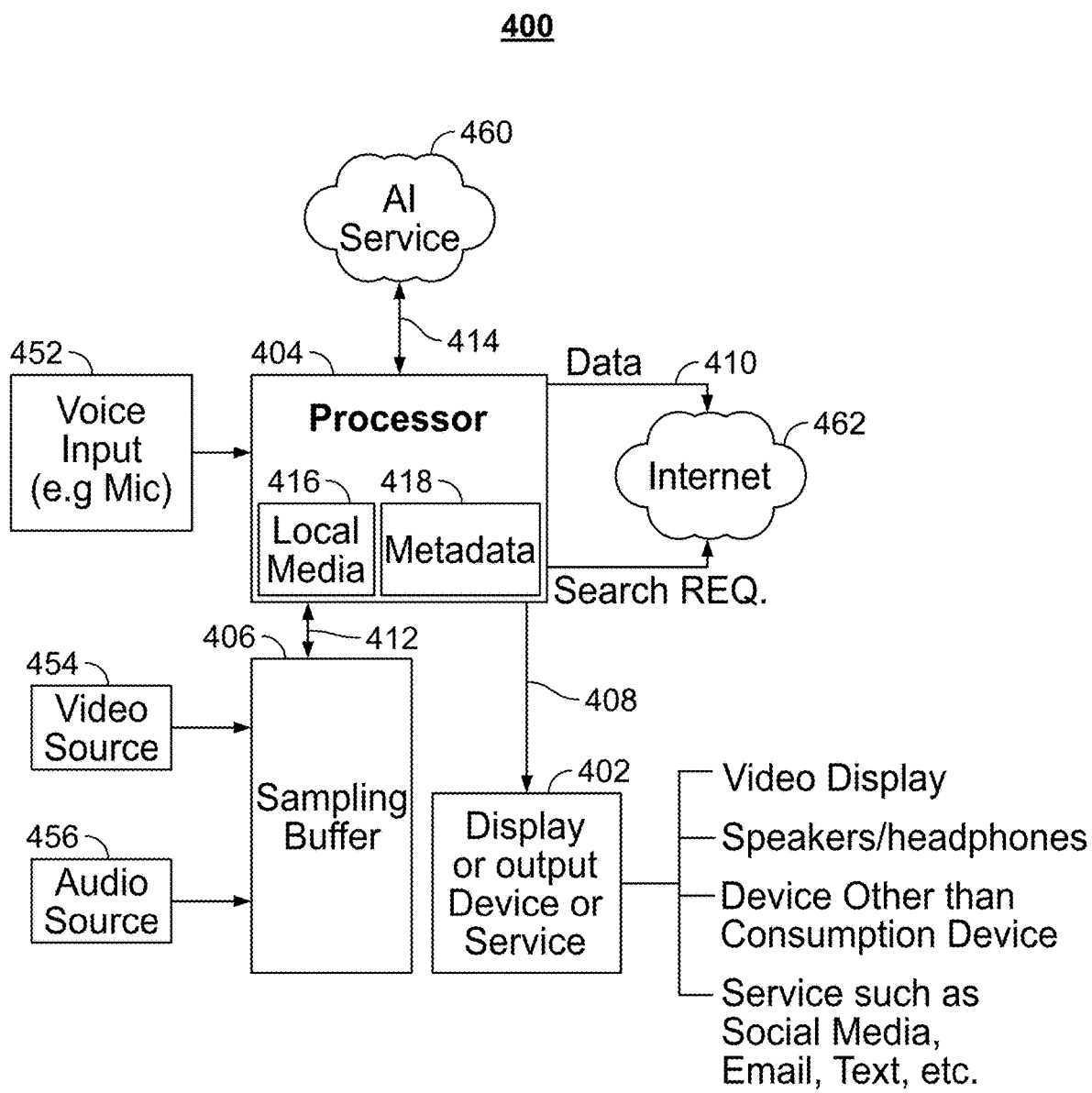
FIG. 4 is a block diagram of an illustrative search system in accordance with some embodiments of the disclosure.

User equipment device 300 of FIG. 3 can be implemented in system 400 of FIG. 4 as part of processor 404. Processor 404 may include numerous types of equipment (and more than one of) such as user television equipment, user computer equipment, wireless user communications devices, and/or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a search application may be implemented, may function as a standalone device or may be part of a network of devices. Likewise, user equipment and processor 404 may be separate devices or a single device. Various network configurations of devices may be implemented and are discussed in more detail below.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, system 400 may include a display or output device 402. Output device 402 may be referred to as a "second screen device." For example, a second screen device may supplement content presented on a first user equipment device. The content presented on the second screen device may be any suitable content that supplements the content presented on the first device. In some embodiments, or output device 402 may be a voice output device (e.g., a digital voice assistant 105 of FIG. 1) configured to generate voice output. Output device 402 may include at least one of a video display, speakers, headphones, other media consumption device, or an output service such as e-mail interface, social-media interface or text messaging interface. For example, system 40 may provide output (e.g., search results) via mail interface, social-media interface or text messaging interface of output device 402.

The various parts of system 400 (e.g., processor 404, output device 402, sampling buffer 406, and external Internet source 462) may be coupled together by communications networks 408, 410, and 412 (referred to herein collectively as communications network). Communications network may be one or more networks including the Internet, a mobile phone network, mobile voice or data network (e.g., a 4G or LTE network), cable network, public switched telephone network, or other types of communications network or combinations of communications networks. Paths 408 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between output device 402 and sampling buffer 406, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. Processor 404 may also communicate with AI service 460 via communications network 414. Additionally, voice input 452, which may correspond to user input interface 310) as well as video source 454 and audio source 456, may communicate directly with each other via communication paths as well as the other components described above.

Sampling buffer 406 may be a region of a physical memory storage used to temporarily store data while it is being moved from one place to another. In some embodiments, sampling buffer 406 may be incorporated into processor 404 or user equipment 402. Typically, the data is stored in a buffer as it is retrieved from an input such as video source 454 and audio source 456. Sampling buffer 406 can be implemented in a fixed memory location in hardware (e.g., storage 308)—or by using a virtual data buffer in software, pointing at a location in the physical memory. In some embodiments, sampling buffer 406 may be used to store several past frames of a video that is being provided via video sources 454 or that is being shown on output device 402. The sampling buffer can thus be used by processor 404 to access frames of a video that was recently presented.

Processor 404 includes local media 416 and metadata source 418. Processor 404 is also coupled to AI service via communications network 414. For example, AI service 460 may be used to perform any search application function describe herein. For example, AI service may be able to perform speech to text and text to speech conversion and analyze frames of a video to identify a performed action. Processor 404 may be a headend system or coupled to and/or integrated into a local device (e.g., as a set-top box). Communications with the local media 416 and metadata source 418 may be exchanged over one or more communications paths discussed herein. In addition, there may be more than one of each of local media 416 and metadata source 418, but only one of each is shown in FIG. 4 to avoid overcomplicating the drawing. If desired, local media 416 and metadata source 418 may be integrated as one source device. Sources 416 and 418 may communicate with output device 402 and sampling buffer 406 directly or through processor 404 via communication paths such as those described above in connection with paths 408, 410, and 412.

Local media 416 may receive and store data from one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. Local media 416 may receive and store data from sources that include cable sources, satellite providers, on-demand providers, Internet providers, over-the-top content providers, or other providers of content. Local media 416 may also include a remote media server used to store different types of content (including video content selected by a user), in a location remote from any of the user equipment devices.

Processor 404 may be communicatively coupled to external Internet source 462, e.g., via network 410. In some embodiments, processor 404 may send and receive data to external internet source 462. For example, search request generated by a search application may be sent to external internet source 462. Processor 404 may receive the search results from external internet sources 462 and process the search results for output to output device 402.

In some embodiments, system 400 may include remote computing sites such as AI service 460. AI service 460 may include any service where intelligence is supplied by technology that makes feasible the execution of algorithms that mimic cognitive functions. For example, learning functions created by AI, allow the execution of algorithms mimicking human activities related with problem solving, recommendations, and/or decision making to the computational level. AI services may generate a consistent increase of the efficiency, quality and efficacy through predictions, recommendations and classifications. For example, machine learning can consider data that influence recommendation engine performance, leading to more accurate or timely recommendations and calibrations by spotting patterns in large volumes of data.

Figure 5:
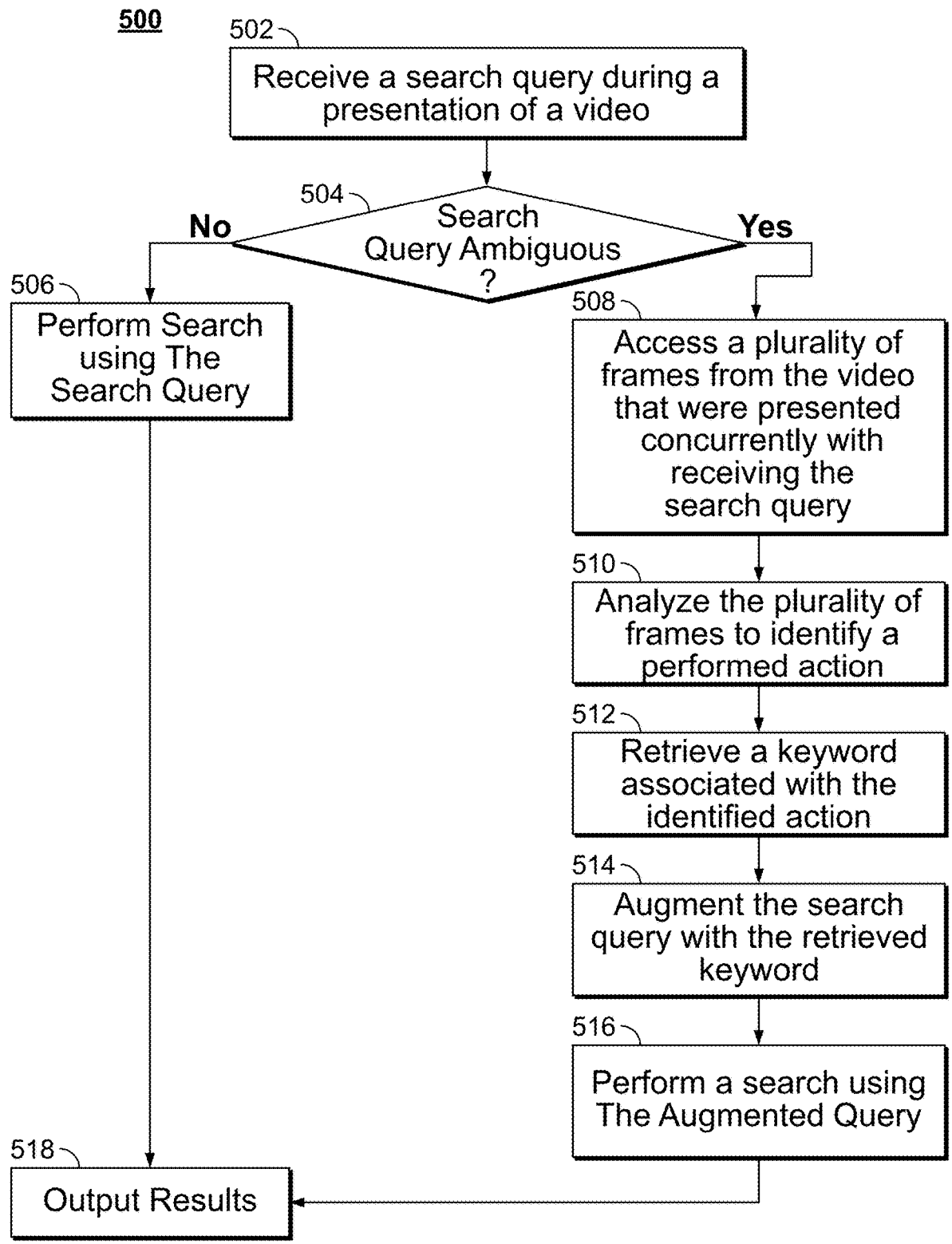
FIG. 5 is a flowchart of a detailed illustrative process for providing contextual search results to an ambiguous query, in accordance with some embodiments of the disclosure.

FIG. 5 is a flowchart of an illustrative process for providing contextual search results to an ambiguous query, in accordance with some embodiments of the disclosure. In some embodiments, each step of process 500 can be performed by user device 300 (e.g. via control circuitry 304) or any of the system components shown in FIGS. 3-4.

Process 500 begins at block 502 where control circuitry 304 receives a search query. For example, the search query may be received via user input interface 310. For example, control circuitry 304 may receive the search query as audio signal via voice input 452. In another embodiment, control circuitry 304 receives search input as text. In some embodiments, control circuitry 304 may receive the search query (e.g., "what is she doing") via digital assistant 105 of FIG. 1.

At 504, control circuitry 304 processes the search query to determine whether it is ambiguous. For example, control circuitry 304 may evaluate each word of the query and check if it contains a pronoun, an auxiliary verb or a word (e.g., a verb) that has multiple possible meanings. If control circuitry 304 determines that the search query is ambiguous, control circuitry 304 proceeds to block 508, otherwise, control circuitry 304 proceeds to 506.

At 506, control circuitry 304 may perform a search using the search query (as it was received). For example, control circuitry 304 may send a query to an internet source 462 or to AI service 460 via network 414 or network 410.

At 508, control circuitry 304 accesses a plurality of frames of a video that was presented concurrently with the time when the search query was received at 502. For example, control circuitry 304 may access one or more frames from a buffer (e.g., sampling buffer 406) which stores several frames of the video that is being presented (e.g., on screen display 312, output device 402, or any other display). In some embodiments, control circuitry 304 may extract a predetermined number of frames that are presented after the search quarry as received at block 502 or before the search query was received at 502. In one implementation, control circuitry 304 extracts frames for a predetermined time period after the search quarry as received at 502 or before the search query was received at 502. In some embodiments, control circuitry 304 may receive the frames from a remote source (e.g., AI service 460 or Internet source 462). In another implementation, control circuitry 304 may receive the frames from local media sources 416.

At 510, control circuitry 304 may analyze the plurality of frames to identify a performed action. For example, control circuitry 304 may generate a movement model and find a matching movement template (e.g., as shown with respect to element 130 and 132 of FIG. 1). In one example, control circuitry 304 may determine that the plurality of frames depict a person rappelling down a mountain (e.g., as shown in FIG. 1). At 512, control circuitry 304 retrieves a keyword associated with the identified action (e.g., "rappelling"). For example, the keyword may be retrieved from the matching movement template.

At 514, control circuitry 304 may augment the search query (e.g., "What is she doing"). In some embodiments, control circuitry 304 simply adds the keyword to the query. For example, control circuitry 304 replaces pronouns, (e.g., "she") and auxiliary verbs (e.g., "doing") with the keyword. For example, search query "What is she doing?" may become "What is she <>" as pronouns and auxiliary verbs are removed. The search query may then become "What is rappelling?" as it is augmented with the keyword.

At 516, control circuitry 304 may perform a search using the augmented search query (as it was augmented in block 514). For example, control circuitry 304 may send the modified query to Internet source 462 or to AI service 460 via network 414 or network 410. Control circuitry 304 may then receive search results via network 414 or network 410.

At 518, control circuitry 304 may output the results of the search received in block 506 or in block 516. For example, search results may be displayed as text on display 140 or 312. In some embodiments, control circuitry 304 may generate speech output based on the search results and output the results using output device 402.

Figure 6:
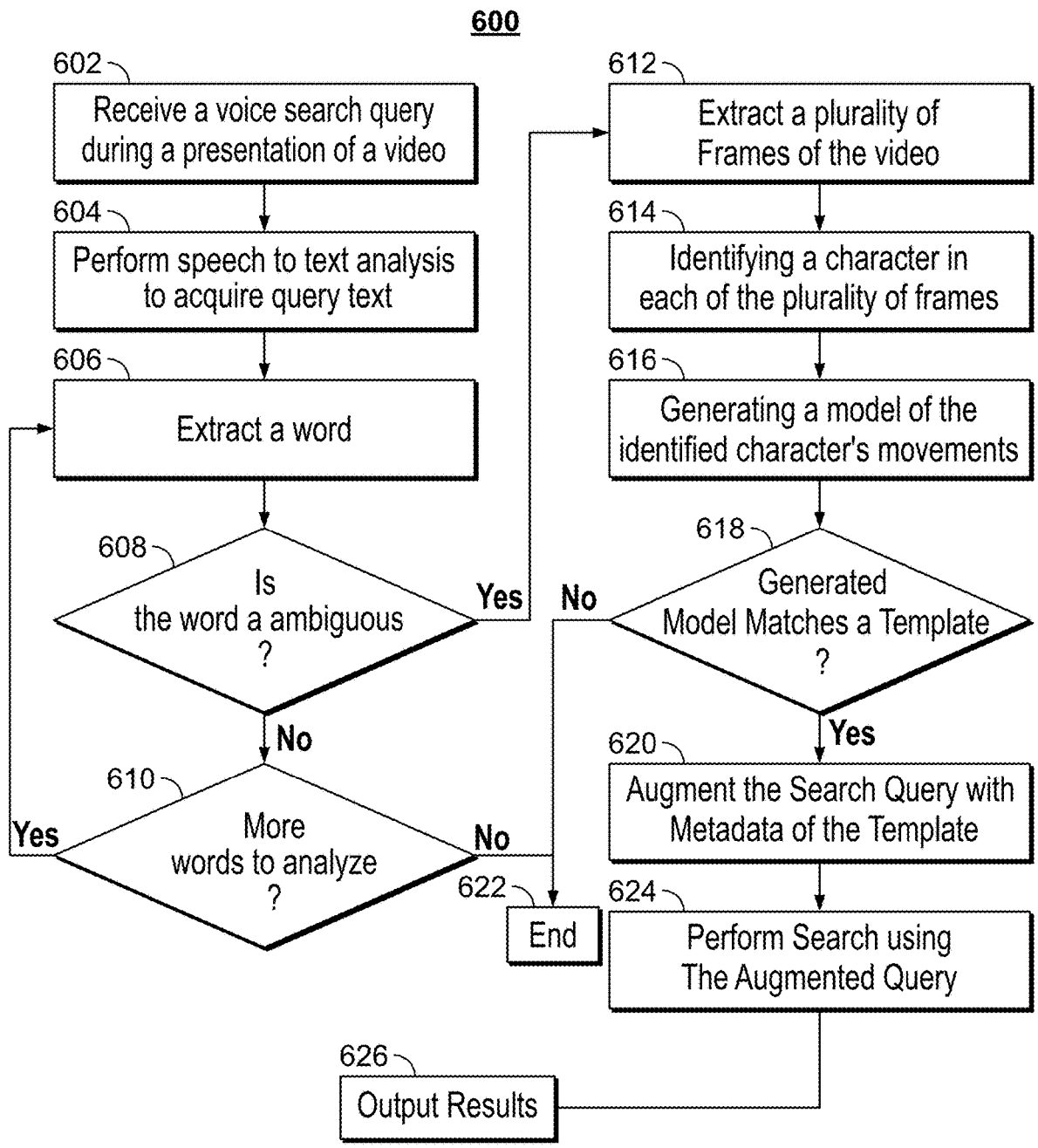
FIG. 6 is flowchart of another detailed illustrative process providing contextual search results to an ambiguous query, in accordance with some embodiments of the disclosure.

FIG. 6 is a flowchart of another illustrative process for providing contextual search results to an ambiguous query, in accordance with some embodiments of the disclosure. In some embodiments, each step of process 600 can be performed by user device 300 (e.g. via control circuitry 304) or any of the system components shown in FIGS. 3-4.

At 602, control circuitry 304 may receive a voice search query. For example, control circuitry 304 may receive the voice search query via voice input 452. At 604, control circuitry 304 may perform speech to text processing to generate a text. In some embodiments, control circuitry 304 may send the voice search query to a remote processor, (e.g. AI service 460), which returns the text of the query via network 414. Control circuitry 304 may use any known speech to text processing algorithm.

At 606, control circuitry 304, may extract a word from the text of the search query (e.g., control circuitry 304 may start by extracting a first word, and moving to a subsequent word every time step 606 is performed). At 608, control circuitry 304 may determine whether the extracted word is a pronoun, an auxiliary verb, or an ambiguous word. This determination may be made by comparing the extracted word to a dictionary of pronouns, auxiliary verbs, and ambiguous words. In some embodiments, control circuitry 304 generates its own dictionary over time by identifying words that have failed to generate good search results. If the extracted word is a pronoun, an auxiliary verb, or an ambiguous word, process 600 proceeds to 612, otherwise process 600 proceeds back to 610. At 610, if there are more words to analyze, process 600 returns to 606 and extracts a next word, otherwise process 600 ends at 622.

At 612, control circuitry 304 extracts a plurality of frames of a video that was being played concurrently with receipt of the voice query (e.g., on user computer equipment 300). Frames may be extracted as described with respect to steps 508.

At 614, control circuitry 304 may identify a character in each of the frames. For example, a human shape can be discovered using an AI (e.g., AI service 460) trained to recognize human shapes. At 616, control circuitry 304 may generate a movement model based on the character in each of the frames. For example, control circuitry 304 may create vectorized representations of body parts and measure angles between the angles (e.g., as showing in FIG. 1 and FIG. 2)

At 618, control circuitry 304 may compare the generated movement model to movement template (e.g., one templates 132 or 242). For example, control circuitry 304 may check whether the difference between angles of vectorized human shape are within a threshold from the angles listed in the template. If no matching template is found, process 600 ends at 622. If a matching template is found, process 600 proceeds to 620. At 620, control circuitry 304 may augment the search quart with metadata (e.g., the title) of the matching template. For example, the value of "title" field of a matching template is retrieved and added to the search query. At 624, control circuitry 304 may perform a search (e.g., an Internet search via internet source 462) using the augmented query. At 626, control circuitry 304 may output the results of the search on a screen (e.g., display 312) or as a voice output (e.g., via output device 402).

Figure 7:
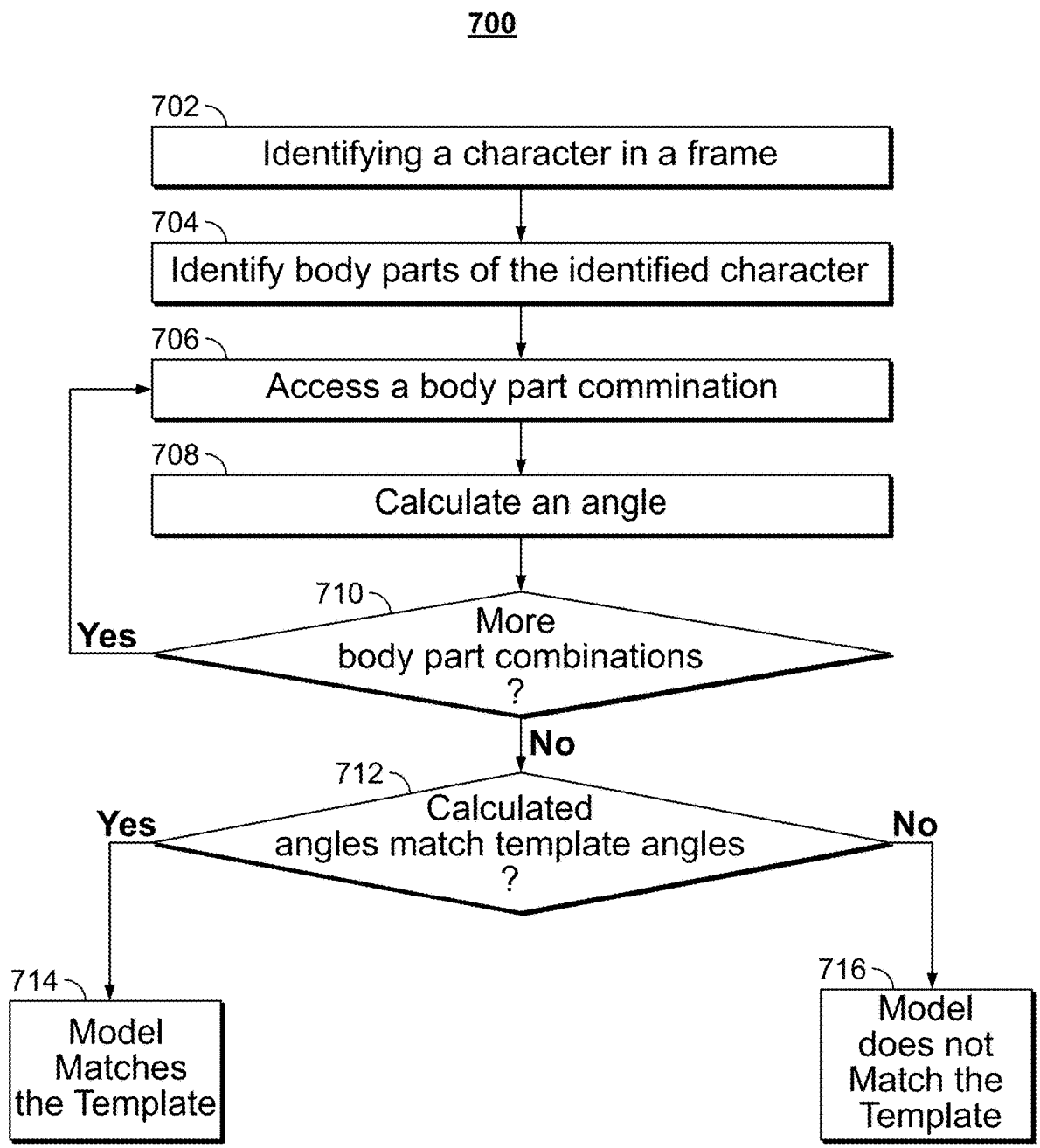
FIG. 7 is a flowchart of a detailed illustrative process for identifying a performed action, in accordance with some embodiments of the disclosure.

FIG. 7 is a flowchart of another illustrative process for identifying a performed action, in accordance with some embodiments of the disclosure. In some embodiments, each step of process 700 can be performed by user device 300 (e.g. via control circuitry 304) or any of the system components shown in FIGS. 3-4. Process 700 may be performed as part of step 618 after a plurality of frames of a video is accessed.

At 702, control circuitry 304 may identify a character in the frame. In some embodiments, control circuitry 304 may use any known computer vision technique or AI human body search (e.g., using AI service 460) to identify pixels of a frame that define a shape of a human body.

At 704, control circuitry 304 may identify body parts of the identified character. For example, control circuitry 304 may use any known computer vision technique or AI search to identify, torso, legs and arms. Some embodiments may generate a vector representation of each body part (e.g., as shown in element 230-238 of FIG. 2).

At 706, control circuitry 304 may access a body part combination of the identified body parts. For example, the body part combination may include: {torso, left arm}, {torso, right arm}, {upper left arm, lower left arm}, {upper right arm, lower right arm}, {torso, left leg}, {torso, right leg}, {upper left leg, lower left leg}; {upper right leg, lower right leg}. At 708, control circuitry 304 may calculate an angle for the selected body part combination. The resulting angle may be stored in memory 308 as part of a movement model (e.g., movement model 240). At 710, control circuitry 304, may check if some body part combinations are not yet analyzed. If so, process 700 returns to 706. Otherwise, process 700 proceeds to 712.

At 712, control circuitry 304 may determine whether computed angles match expected angles listed in a movement template (e.g., table 242.) For example, control circuitry 304 may check if the angles are within the range specified by the movement template or within threshold of an angle value specified by the movement template. If the angles match, process 700 may procced to step 714. In some embodiments, process 700 may procced to step 714 only if the match succeeds for angles generated for each frame of a plurality of the plurality of frames extracted at step 612. If the match fails, process 700 proceeds to 716.

At 714, control circuitry 304 determines that the movement model matches the template. At 716, control circuitry 304 determines that the movement model does not match the template. This determination may be used by process 600 to procced differently during step 618.

Figure 8:
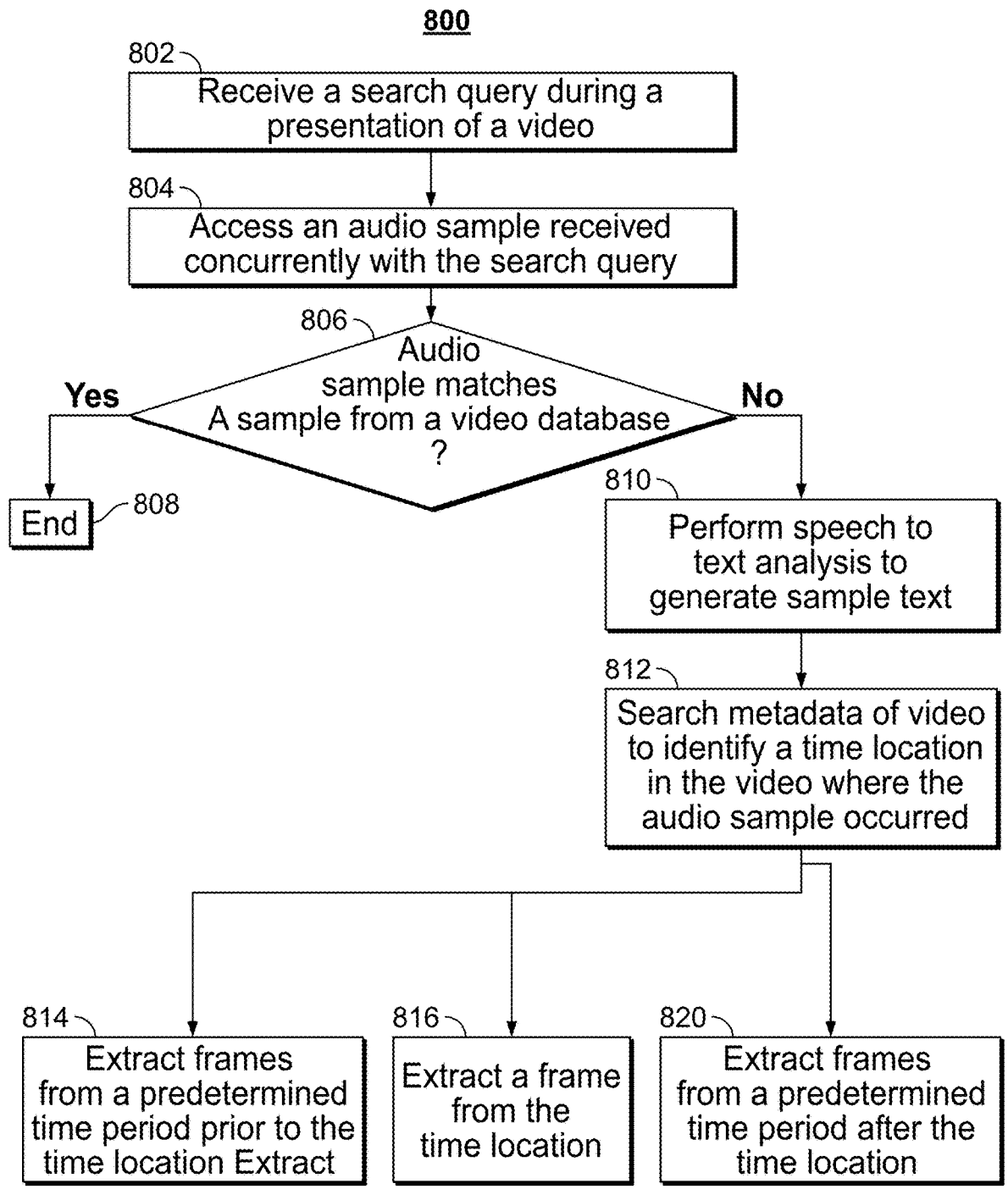
FIG. 8 is a flowchart of a detailed illustrative process for accessing a plurality of frames, in accordance with some embodiments of the disclosure.

FIG. 8 is a flowchart of an illustrative process for accessing a plurality of frames, in accordance with some embodiments of the disclosure. In some embodiments, each step of process 800 can be performed by user device 300 (e.g. via control circuitry 304) or any of the system components shown in FIGS. 3-4. Process 800 may be performed as part of step 612 to access a plurality of frames of a video. Step 800 is performed as an alternative to local extraction of frames using sampling buffer 406, for example, if the user is watching a video on a smartphone with limited memory.

At 802, control circuitry 304 may receive a search query as described in step 502. At 804, control circuitry 304 may also receive an audio sample received concurrently with the search query. For example, voice input 452 may capture user voice and a sample of an audio track of the video that was being presented at the time (e.g., via audio source 456).

At 806, control circuitry 304 checks if the received sample matches a sample from a database of video programming. For example, control circuitry 304 may calculate a freqeuncy signature of the sample (e.g., by using a Fourier transform) and compare it to a signature of videos stored in a database (e.g., via metadata sources 418). For example, control circuitry 304 may determine that the signature matches a signature of a TV show "Climbing the Eiger."

At 810, control circuitry 304 may perform the speech to text analysis of the audio sample. For example, control circuitry 304 may determine that the sample includes the dialogue line "she is in a middle of a dangerous rappel." At 812, control circuitry 304 may search the metadata of the matched video (e.g., timestamped metadata of TV show "Climbing the Eiger") to identify a time location where the sample occurred. For example, control circuitry 304 may determine that the sample occurred at the 23:50 time mark of the TV show "Climbing the Eiger."

At steps 814, 816, and 820, control circuitry 304 may extract frames of a remote copy of the identified video (e.g., "Climbing the Eiger."). For example, control circuitry 304 may extract frames from a remote copy stored at an Internet location 462 or at metadata sources 418. At 814, control circuitry 304 may extract frames from a predetermined time period (e.g., 2 second) prior to the time location where the sample occurred (e.g., from 23:47-23:49). At 816, control circuitry 304 may extract frames from the time location where the sample occurred (e.g., from 23:50). At 830, control circuitry 304 may extract frames from a predetermined time period (e.g., 2 second) after the time location where the sample occurred (e.g., from 23:51-23:53). The extracted frames may then be accessed as described with respect to steps 508 and 612.

Figure 9:
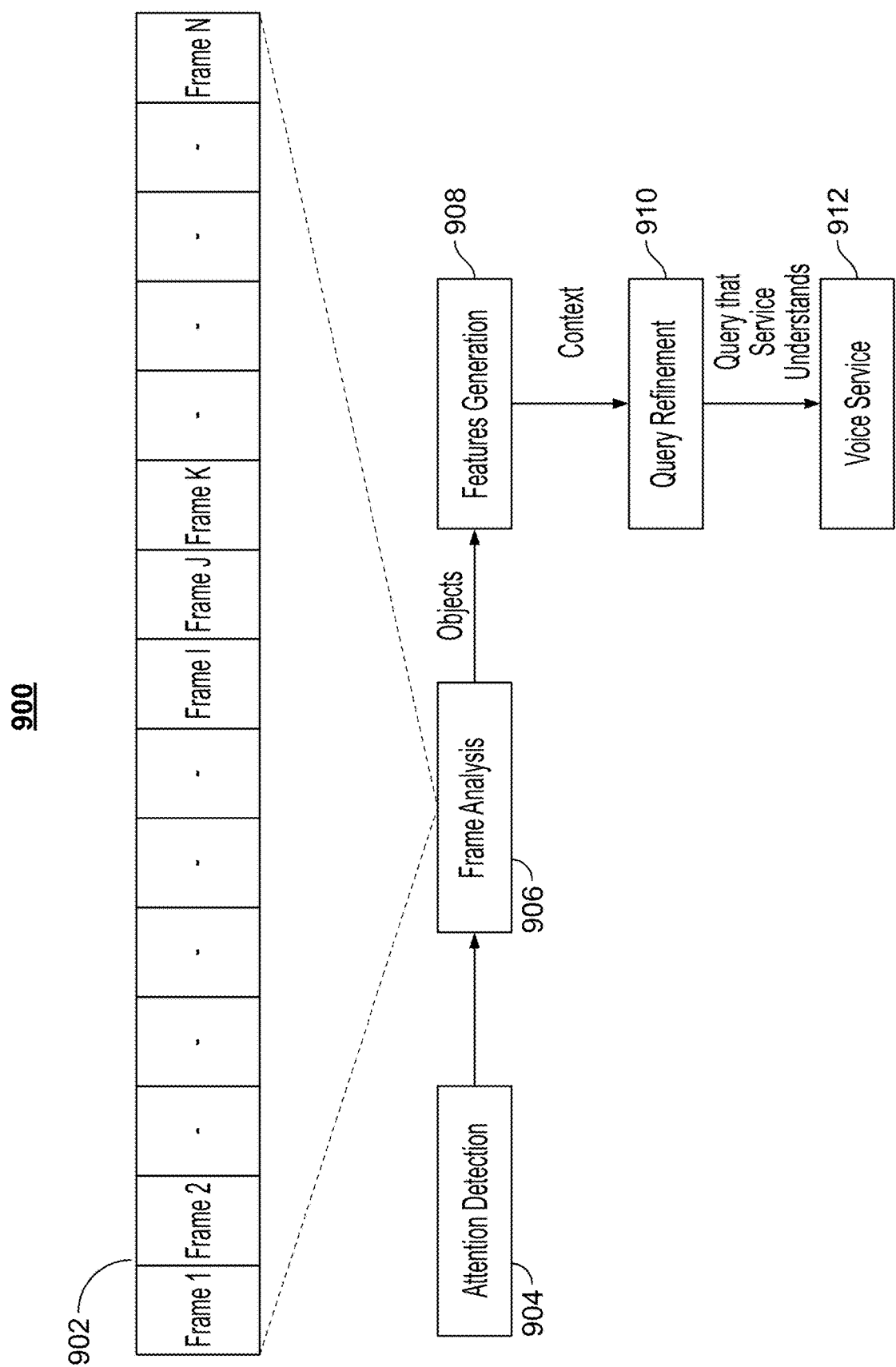
FIG. 9 is a flowchart of a detailed illustrative process for analyzing features of relevant frames to refine a query, in accordance with some embodiments of the disclosure.

FIG. 9 is a flowchart of a detailed illustrative process for analyzing features of relevant frames to refine a query, in accordance with some embodiments of the disclosure. In some embodiments, each step of process 900 can be performed by user device 300 (e.g. via control circuitry 304) or any of the system components shown in FIGS. 3-4. Process 900 may be performed as part of steps 510-518 or instead of the steps 510-518.

At 904, control circuitry 304 may detect that a user paying attention to presentation of frames 1-N 902 while making a query (e.g., voice query as described in step 502 of FIG. 5). For example, control circuitry 304 may use remote control signal to gage the level of engagement. In another example, control circuitry 304 may utilize camera input to ascertain that the user is engaged with presentation of frames 902. When control circuitry 304 determine that the user is paying attention, process 900 proceeds to frame analysis 906.

At 906, control circuitry 304 analyzes each of the frames 902 to identify objects that are displayed in each frame. For example, control circuitry 304 may use object recognition techniques to identify objects in each frame (e.g., actors, trees, cars, geographical features, buildings, etc.). For example, control circuitry 304 may create a table of objects that maps the objects to frames in which they appear. For example, control circuitry 304 may generate Table 1 (as shown below) based on frames 902.

TABLE 1

| Object | Frames |
| --- | --- |
| Person A | Frames 1-10 |
| Car | Frames 1-K |
| Tree | Frames 1-K |
| Cityscape | Frames 1-N |
| Person B | Frames K-N |
| Table | Frames 15-35 |
| Chair | Frames 15-35 |

Once objects are identified for each frame, process 900 proceeds to feature generation 908.

At 908, control circuitry 304 may generate context (e.g., generate context data structures) for sets of frames. For example, control circuitry 304 may generate one context data structure for time period defined by frames 1-K and another context data structure for time period defined by frames 15-35. In some embodiments, control circuitry 304 generates feature keywords for the context data structure by analyzing objects present in certain frames. In one implementation, control circuitry 304 uses machine learning model that is trained to classify detected objects (e.g., objects of Table 1) to generate feature keywords. In some embodiments, feature generation may include identification of actions performed in certain frames. For example, once a character is identified in frames 110 and 112 of FIG. 1, control circuitry 304 may use feature generation techniques to generate a feature keyword "rappelling" (e.g., as described with respect to FIGS. 1 and 2). In some embodiments, control circuitry 304 may generate Table 2 (as shown below) based on Table 1.

TABLE 2

| Time period | Features |
| --- | --- |
| Frames 1-K | {Outdoors, Car Chase, Rome, Italy} |
| Frames 15-35 | {Indoors, Kitchen, Cooking Pasta} |
| Frames K-N | {Outdoors, Mountains, Woman, Rappelling, Eiger} |

In some embodiments, the detected features can be used to provide context to a user query was received during the presentation of frames 902 (e.g., a query received at step 502). For example, a query (e.g., a voice query) received in step 502 may be received at some point during the presentation of frames 1-N 902, but it may not be immediately apparent which frames of frames 902 are referenced by the query. To solve this problem, control circuitry 304 may search the features of Table 2 for matching contextual keywords.

For example, control circuitry 304 may determine that the query includes the word "car" (e.g., when the query is "what car is it?") and that a car was depicted in frames 1-K. In this case, control circuitry 304 may determine that the query was referencing frames 1-K. In another example control circuitry 304 may determine that the query includes the word "doing" (e.g., when the query is "what is she doing?") and an action or rappelling was shown in frames K-N. In this case, control circuitry 304 may determine that the query was referencing frames K-N.

It should be noted that while Tables 1 and 2 (or similar data structures) may be generated locally (e.g., by control circuitry 304), in some embodiments, such data structures may be pre-generated and included in the video stream data (e.g., video stream from video source 454). In some embodiments, the data structures may be included in Hypertext Transfer Protocol Live Streaming (HLS) playlist file. In some embodiments, the features of Table 1 or 2 may be encoded into each of the frames 902.

At 910, control circuitry 304 may refine the query based on the context data generated at step 908. For example, if the query referenced a car, control circuitry 304 may investigate frames 1-K to refine the query. In some embodiments, control circuitry 304 may know the position of the car in each frame such that only the relevant part of the image is analyzed. For example, if the query was "what kind of car is this?", control circuitry 304 may determine that the car shown in frames 1-K is a Mercedes 500, and modify the query to be "Information about Mercedes 500?" In another example, if the query is "How can I get there?", control circuitry 304 may analyze frames 1-K and determine that Rome cityscape is shown. In this case, control circuitry 304 may modify the query to be "How can I get to Rome, Italy?" In yet another embodiment, if the query is "what is she doing?" control circuitry 304 may analyze frames K-N and determine that a rappelling action was shown. In this case, control circuitry 304 may modify the query to be "what is rappelling" (e.g., as shown in FIG. 1.).

At 912, control circuitry 304 may send the refined query to a voice service (e.g., AI Service 460) via network (e.g., network 414). In some embodiments, control circuitry 304 may receive search results from the voice service and output the received results (e.g., via speakers 314 or via display 312).

It should be noted that processes 500-900 or any step thereof could be performed on, or provided by, any of the devices shown in FIGS. 1-3. For example, the processes may be executed by control circuitry 304 (FIG. 3) as instructed by a search application. In addition, one or more steps of a process may be omitted, modified, and/or incorporated into or combined with one or more steps of any other process or embodiment (e.g., steps from process 600 may be combined with steps from processes 700, 800, and 900). In addition, the steps and descriptions described in relation to FIGS. 4-9 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing contextual search results to ambiguous queries, the method comprising:
   receiving a search query during a presentation of a portion of a video;
   determining whether at least one word in the search query is ambiguous;
   in response to determining that at least one word in the search query is ambiguous, identifying a performed action from the portion of the video that was presented concurrently with receiving the search query;
   determining a keyword associated with the identified performed action;
   performing a text-based search based on the search query and the keyword; and
   outputting results of the search.

2. The method of claim 1,
   wherein identifying the performed action comprises:
      identifying a character in the portion of the video;
      generating a model of the identified character's movements;
      determining that the generated model matches a movement template; and
   wherein retrieving the keyword associated with the identified performed action comprises retrieving metadata of the movement template.

3. The method of claim 2, wherein generating a model of the identified character's movements comprises:
   identifying body parts of the identified character; and
   calculating an angle between two body parts of the identified character.

4. The method of claim 3, wherein determining that the generated model matches the movement template comprises:
   comparing the calculated angle with a reference angle of the movement template; and
   in response to determining that the calculated angle matches a reference angle determining that the generated model matches the movement template.

5. The method of claim 1, wherein receiving the search query comprises:
   detecting user voice input; and
   performing speech to text analysis of the user voice input to derive the search query.

6. The method of claim 1, wherein determining that at least one word in the search query is ambiguous comprises:
   determining that the search query comprises at least one of: a pronoun and an auxiliary verb.

7. The method of claim 1, wherein identifying the performed action from the portion of the video that was presented concurrently with receiving the search query further comprises:
   receiving an audio sample of the portion of the video that was presented concurrently with receiving the search query;
   identifying a time location in the video where the audio sample occurred; and
   extracting frames corresponding to the time location.

8. The method of claim 7, wherein extracting frames corresponding to the time location comprises:
   extracting frames from a predetermined time period prior to the time location; and
   extracting frames from a predetermined time period after the time location.

9. The method of claim 1, wherein identifying the performed action from the portion of the video that was presented concurrently with receiving the search query further comprises capturing an extended portion of the video for a predetermined time period after receiving the search query.

10. The method of claim 1, wherein identifying the performed action from the portion of the video that was presented concurrently with receiving the search query further comprises capturing a predetermined number of displayed frames after receiving the search query.

11. A system for providing contextual search results to ambiguous queries, the system comprising;
   input/output circuitry of a device configured to:
      receive a search query during a presentation of a video; and
   processing circuitry of the device configured to:
      determine whether at least one word in the search query is ambiguous;
      in response to determining that at least one word in the search query is ambiguous, identify a performed action from the portion of the video that was presented concurrently with receiving the search query;
      determine a keyword associated with the identified performed action;
      perform a text-based search based on the search query and the keyword; and
   output results of the search.

12. The system of claim 11,
   wherein, when identifying the performed action, the processing circuitry is further configured to:
      identify a character in the portion of the video;
      generate a model of the identified character's movements;
      determine that the generated model matches a movement template; and
   wherein, when retrieving the keyword associated with the identified performed action, the processing circuitry is configured to retrieve metadata of the movement template.

13. The system of claim 12, wherein, when generating a model of the identified character's movements, the processing circuitry is further configured to:
   identify body parts of the identified character; and
   calculate an angle between two body parts of the identified character.

14. The system of claim 13, wherein, when determining that the generated model matches the movement template, the processing circuitry is further configured to:
   compare the calculated angle with a reference angle of the movement template; and
   in response to determining that the calculated angle matches a reference angle, determine that the generated model matches the movement template.

15. The system of claim 11, wherein, when receiving the search query, the processing circuitry is further configured to:
  detect user voice input; and
  perform speech to text analysis of the user voice input to derive the search query.

16. The system of claim 11, wherein, when determining that at least one word in the search query is ambiguous, the processing circuitry is further configured to:
  determine that the search query comprises at least one of: a pronoun and an auxiliary verb.

17. The system of claim 11, wherein, when identifying the performed action from the portion of the video that was presented concurrently with receiving the search query further comprises, the processing circuitry is further configured to:
  receive an audio sample of the portion of the video that was presented concurrently with receiving the search query;
  identify a time location in the video where the audio sample occurred; and
  extract frames corresponding to the time location.

18. The system of claim 17, wherein, when extracting frames corresponding to the time location, the processing circuitry is further configured to:
  extract frames from a predetermined time period prior to the time location; and
  extract frames from a predetermined time period after the time location.

19. The system of claim 11, wherein, when identifying the performed action from the portion of the video that was presented concurrently with receiving the search query further, the processing circuitry is further configured to capture an extended portion of the video for a predetermined time period after receiving the search query.

20. The system of claim 11, wherein, when identifying the performed action from the portion of the video that was presented concurrently with receiving the search query further, the processing circuitry is further configured to capture a predetermined number of displayed frames after receiving the search query.

* * * * *